(12) United States Patent
Tsukagoshi

(10) Patent No.: US 10,848,800 B2
(45) Date of Patent: Nov. 24, 2020

(54) TRANSMISSION APPARATUS, TRANSMISSION METHOD, RECEPTION APPARATUS, AND RECEPTION METHOD FOR SWITCHING VIDEO DATA TYPES

(71) Applicant: SONY CORPORATION, Tokyo (JP)

(72) Inventor: Ikuo Tsukagoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 75 days.

(21) Appl. No.: 15/777,353

(22) PCT Filed: Dec. 19, 2016

(86) PCT No.: PCT/JP2016/087735
§ 371 (c)(1),
(2) Date: May 18, 2018

(87) PCT Pub. No.: WO2017/119270
PCT Pub. Date: Jul. 13, 2017

(65) Prior Publication Data
US 2019/0261029 A1    Aug. 22, 2019

(30) Foreign Application Priority Data

Jan. 8, 2016  (JP) ................................ 2016-002965

(51) Int. Cl.
*H04N 7/12* (2006.01)
*H04N 21/2365* (2011.01)
(Continued)

(52) U.S. Cl.
CPC ......... *H04N 21/2365* (2013.01); *H04N 19/46* (2014.11); *H04N 19/85* (2014.11);
(Continued)

(58) Field of Classification Search
CPC ........................... H04N 21/2365; H04N 19/46
See application file for complete search history.

(56) References Cited

U.S. PATENT DOCUMENTS

| | | | |
|---|---|---|---|
| 2008/0151885 | A1 | 6/2008 | Horn et al. |
| 2016/0345032 | A1 | 11/2016 | Tsukagoshi et al. |
| 2017/0026627 | A1 | 1/2017 | Toma et al. |

FOREIGN PATENT DOCUMENTS

| | | |
|---|---|---|
| CN | 101116306 A | 1/2008 |
| CN | 102884800 A | 1/2013 |

(Continued)

OTHER PUBLICATIONS

International Search Report dated Mar. 20, 2017, in PCT/JP2016/087735 filed Dec. 19, 2016.

(Continued)

*Primary Examiner* — Y Lee
(74) *Attorney, Agent, or Firm* — Oblon, McClelland, Maier & Neustadt, L.L.P.

(57) ABSTRACT

There is provided a transmission apparatus including circuitry configured to generate a video stream that switches between transmission video data of a plurality of types. Each of the plurality of types of the transmission video data has a different predetermined opto-electronic conversion characteristic. The circuitry is further configured to insert identification information into the video stream. The identification information indicates the type of one of the transmission video data included in the video stream.

13 Claims, 17 Drawing Sheets

(51) Int. Cl.
    *H04N 19/46* (2014.01)
    *H04N 21/2362* (2011.01)
    *H04N 21/431* (2011.01)
    *H04N 21/434* (2011.01)
    *H04N 21/438* (2011.01)
    *H04N 21/654* (2011.01)
    *H04N 21/6547* (2011.01)
    *H04N 19/85* (2014.01)
    *H04N 21/845* (2011.01)

(52) U.S. Cl.
    CPC ..... *H04N 21/2362* (2013.01); *H04N 21/4318* (2013.01); *H04N 21/4345* (2013.01); *H04N 21/4383* (2013.01); *H04N 21/654* (2013.01); *H04N 21/6547* (2013.01); *H04N 21/8451* (2013.01)

(56) References Cited

FOREIGN PATENT DOCUMENTS

| | | |
|---|---|---|
| CN | 103907343 A | 7/2014 |
| JP | 2014-534719 A | 12/2014 |
| JP | 2015-228691 A | 12/2015 |
| WO | WO 2008/016213 A1 | 2/2008 |
| WO | WO 2015/118909 A1 | 8/2015 |
| WO | WO 2015/159786 A1 | 10/2015 |
| WO | WO 2015/174026 A1 | 11/2015 |

OTHER PUBLICATIONS

Borer, T., "Non-linear Opto-Electrical Transfer Functions for High Dynamic Range Television", BBC Research & Development White Paper WHP 283, Jul. 2014, 23 pages.

Japanese Office Action dated Jun. 4, 2019, in Patent Application No. 2016-002965, 6 pages.

Matteo, N. et al., "High dynamic range compatibility information SEI message", Joint Collaborative Team on Video Coding (JCT-VC) of ITU-T SG 16 WP 3, Jun. 2015, 9 pages.

Office Action dated Feb. 18, 2020 in European Application No. 16 828 794.4, filed Dec. 19, 2016.

Chinese Office Action Issued in Chinese Patent Application 2016800769196 dated May 8, 2020, with English Translation (23 pages).

"transfer_function SEI" Syntax

| Syntax | No. of Bits | Format |
|---|---|---|
| transfer_function SEI ( ) { | | |
| transferfunction | 8 | uimsbf |
| peak_luminance | 16 | uimsbf |
| color_space | 8 | uimsbf |
| } | | |

FIG.4A

| transferfunction | (※) | BT.709-5 Transfer Function (SDR)<br>"1"  10bit BT.2020 Transfer Function (SDR)<br>"14" SMPTE 2084 Transfer Function (HDR1)<br>"16" ARIB STD B-67 Transfer Function (HDR2)<br>"18" | peak_luminance    Maximum luminance level color_space       Color space information (※) When value of this element and value of "transferfunction" of VUI are different, value of "transferfunction" is replaced with value of this element.

FIG.4B

"display_switch SEI" Syntax

| Syntax | No. of Bits | Format |
|---|---|---|
| display_switch SEI ( ) { | | |
|   alternate_picture_flag | 1 | bslbf |
|   reserved | 7 | 0x7f |
| } | | |

FIG.5A

| alternate_picture_flag | |
|---|---|
| "1" | Using alternate picture for display picture is permissible. |
| "0" | Using alternate picture for display picture is impermissible (Display of decoded picture is indispensable). |

FIG.5B

'HDR descriptor' Syntax

| Syntax | No. of Bits | Format |
|---|---|---|
| HDR descriptor( ) { | | |
| descriptor_tag | 8 | bslbf |
| descriptor_length | 8 | bslbf |
| HDR_SDR_flag | 1 | bslbf |
| characteristics_info_flag | 1 | bslbf |
| color_space_flag | 1 | bslbf |
| reserved | 5 | 0x1f |
| if( characteristics_info_flag ) { | | |
| transferfunction | 8 | uimsbf |
| } | | |
| if(color_space_flag ) { | | |
| color_space | 8 | uimsbf |
| } | | |
| } | | |

FIG.7

| | |
|---|---|
| HDR_SDR_flag | |
| "1" | Target stream is HDR. |
| "0" | Target stream is SDR. |
| | |
| characterestics_info_flag | |
| 1 | Characteristic information is present. |
| 0 | Characteristic information is absent. |
| | |
| color_space_flag | |
| 1 | Color space information is present. |
| 0 | Color space information is absent. |
| | |
| transferfunction | |
| "1" | BT.709-5 Transfer Function (SDR) |
| "14" | 10bit BT.2020 Transfer Function (SDR) |
| "16" | SMPTE 2084 Transfer Function (HDR1) |
| "18" | ARIB STD B-67 Transfer Function (HDR2) |
| | |
| color_space | Color space information |

FIG.8

TRANSMISSION APPARATUS, TRANSMISSION METHOD, RECEPTION APPARATUS, AND RECEPTION METHOD FOR SWITCHING VIDEO DATA TYPES

CROSS REFERENCE TO RELATED APPLICATIONS

This application claims the benefit of Japanese Priority Patent Application JP 2016-002965 filed Jan. 8, 2016, the entire contents of which are incorporated herein by reference.

TECHNICAL FIELD

The present technology relates to a transmission apparatus, a transmission method, a reception apparatus, and a reception method, and more particularly to, for example, a transmission apparatus that switches between multiple types of transmission video data respectively having predetermined opto-electronic conversion characteristics and then transmits the transmission video data.

BACKGROUND ART

From the past, sending transmission video data obtained by performing high dynamic range opto-electronic conversion on high dynamic range video data has been conceived. Hereinafter, a high dynamic range is described as "HDR" as appropriate. For example, Non Patent Literature 1 describes HDR opto-electronic conversion characteristics (new gamma characteristics) including an area compatible with traditional opto-electronic conversion characteristics (gamma characteristics) in terms of reception by a traditional reception device.

CITATION LIST

Non Patent Literature

NPL 1: Tim Borer, "Non-Linear Opto-Electrical Transfer Functions for High Dynamic Range Television", Research & Development White Paper WHP 283, July 2014

SUMMARY OF INVENTION

Technical Problem

It is desirable to enable a reception side to appropriately perform processing of obtaining display video data from transmission video data when multiple types of transmission video data respectively having predetermined opto-electronic conversion characteristics are switched and transmitted.

Solution to Problem

According to an embodiment of the present technology, there is provided a transmission apparatus including circuitry configured to generate a video stream that switches between transmission video data of a plurality of types. Each of the plurality of types of the transmission video data has a different predetermined opto-electronic conversion characteristic. The circuitry is configured to insert identification information into the video stream. The identification information indicates the type of one of the transmission video data included in the video stream.

In an embodiment of the present technology, there is provided a transmission method. The method includes generating, by circuitry of a transmission apparatus, a video stream that switches between transmission video data of a plurality of types. Each of the plurality of types of the transmission video data has a different predetermined opto-electronic conversion characteristic. The method further includes inserting, by the circuitry, identification information into the video stream. The identification information indicates the type of one of the transmission video data included in the video stream.

In an embodiment of the present technology, there is provided a reception apparatus, including a receiver configured to receive identification information and a video stream that switches between transmission video data of a plurality of types. Each of the plurality of types of the transmission video data has different predetermined optoelectronic conversion characteristics. The identification information indicates the type of one of the transmission video data included in the video stream and is inserted into the video stream. The reception apparatus further includes circuitry configured to decode the video stream to obtain the one of the transmission video data, and process the one of the transmission video data based on the identification information to obtain video data for display.

In an embodiment of the present technology, there is provided a reception method. The method includes receiving, by a receiver of the reception apparatus, identification information and a video stream that switches between transmission video data of a plurality of types. Each of the plurality of types of the transmission video data has different predetermined opto-electronic conversion characteristics. The identification information indicates the type of one of the transmission video data included in the video stream and is inserted into the video stream. The method further includes decoding the video stream to obtain the one of the transmission video data, and processing, by circuitry of the reception apparatus, the one of the transmission video data based on the identification information to obtain video data for display.

In an embodiment of the present technology, there is provided a system, including a transmission apparatus and a reception apparatus. The transmission apparatus includes first circuitry configured to generate a video stream that switches between transmission video data of a plurality of types. Each of the plurality of types of the transmission video data has a different predetermined opto-electronic conversion characteristic. The first circuitry is configured to insert identification information into the video stream. The identification information indicates the type of one of the transmission video data included in the video stream. The reception apparatus includes a receiver configured to receive the video stream and the identification information inserted into the video stream, and second circuitry configured to decode the video stream to obtain the one of the transmission video data, and process the one of the transmission video data based on the identification information to obtain video data for display.

Advantageous Effects of Invention

According to the embodiments of the present technology, it is possible to enable a reception side to appropriately perform video processing of obtaining display video data from transmission video data when multiple types of transmission video data respectively having predetermined opto-electronic conversion characteristics are switched and transmitted. It should be noted that effects described herein are merely examples and are not limitative and additional effects may be provided.

BRIEF DESCRIPTION OF DRAWINGS

FIGS. 4A and 4B are diagrams showing a structure example of a transfer function supplemental enhancement information (SEI) message and content of main information in the structure example, respectively.

FIGS. 5A and 5B are diagrams showing a structure example of a display switch SEI message and content of main information in the structure example, respectively.

FIG. 6 is a diagram for describing a switch timing of transmission video data, the timing at which identification information for identifying a type of the transmission video data after switching is inserted, and the like.

FIG. 7 is a diagram showing a structure example of an HDR descriptor.

FIG. 8 is a diagram showing content of main information in the structure example of the HDR descriptor.

DESCRIPTION OF EMBODIMENTS

Hereinafter, a mode for carrying out the present technology (hereinafter, referred to as "embodiment") will be described. It should be noted that description thereof will be given in the following order.

1. Embodiment
2. Modified Example

1. Embodiment

Configuration Example of Transmission and Reception System

Figure 1:
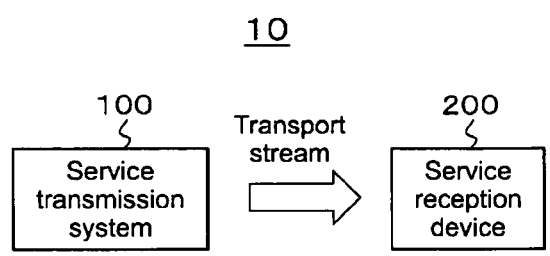
FIG. 1 is a block diagram showing a configuration example of a transmission and reception system according to an embodiment.

FIG. 1 shows a configuration example of a transmission and reception system 10 according to an embodiment. The transmission and reception system 10 includes a service transmission system 100 and a service reception device 200. The service transmission system 100 generates a transport stream (MPEG2 transport stream or MPEG media transport (MMT) stream) serving as a container (multiplexed stream) and transmits the transport stream through broadcasting waves or network packets.

The transport stream contains a video stream. The video stream is obtained by encoding transmission video data. The transmission video data is obtained by switching between multiple types of transmission video data respectively having predetermined opto-electronic conversion characteristics. Identification information indicating a type of the transmission video data of the video stream is inserted into the video stream. The identification information contains conversion characteristic information indicating the opto-electronic conversion characteristics of the transmission video data or electro-optical conversion characteristics corresponding to those characteristics.

Further, when a first video stream corresponding to a first type of transmission video data is switched to a second video stream corresponding to a second type of transmission video data, an End of Sequence, or End of Stream, (EOS) network abstraction layer (NAL) unit is inserted at the end of the first video stream. Furthermore, identification information, which indicates a type of transmission video data of the video stream contained in the transport stream, is inserted into the transport stream such that the type of transmission video data obtained after switching is indicated at a timing earlier than a switch timing of the type of transmission video data by a predetermined amount of time or more.

Additionally, when the first type of transmission video data is switched to the second type of transmission video data, display switch information is inserted into the video stream. The display switch information is assumed, in a first method, to be information indicating a recommended period for display switching in a reception device, and is assumed, in a second method, to be encoded video data for indicating a reception device in a period for display switching.

The service reception device 200 receives the transport stream (MPEG2 transport stream or MMT stream) transmitted from the service transmission system 100. The service reception device 200 decodes a video stream contained in the transport stream to obtain transmission video data. The service reception device 200 performs video processing such as electro-optical conversion on the transmission video data on the basis of the identification information inserted into the transport stream or video stream, and then obtains display video data.

During a period from when the first type of transmission video data is switched to the second type of transmission video data to at least when switching of electro-optical conversion characteristics of an electro-optical converter is ended (picture period), the service reception device 200 outputs, as display video data, output video data of a replacement picture output section, instead of output video data of the electro-optical converter.

Configuration Example of Service Transmission System

Figure 2:
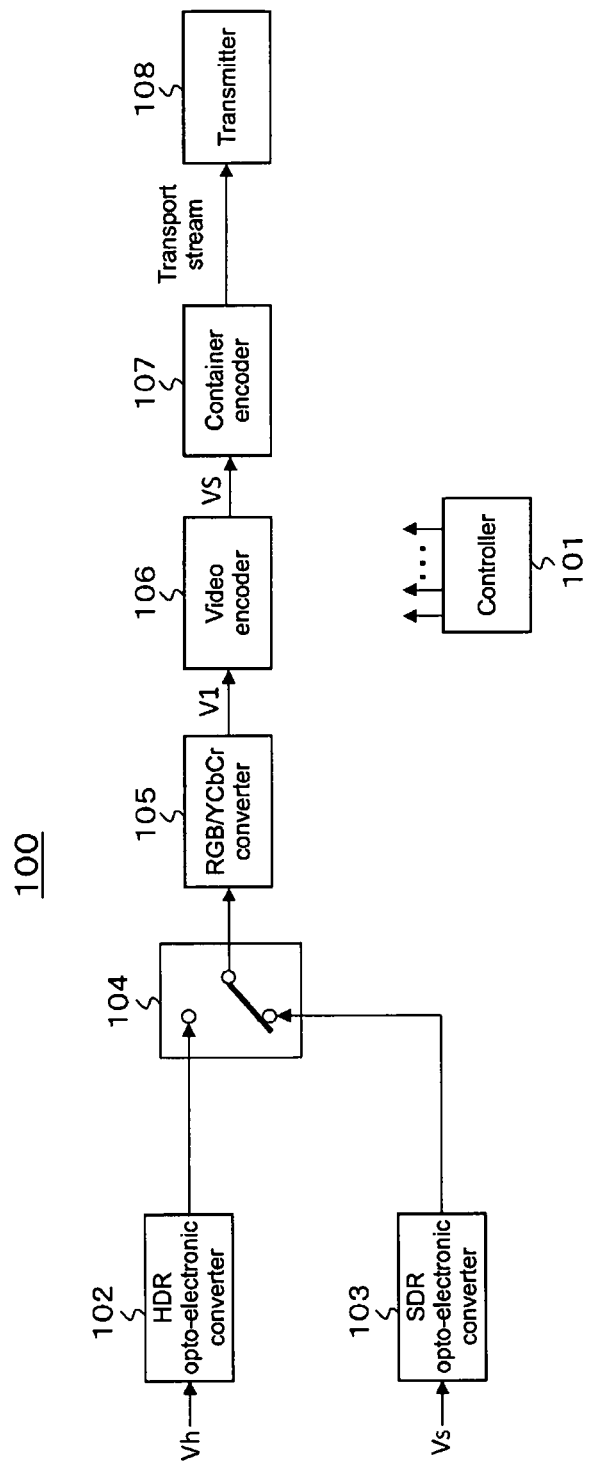
FIG. 2 is a block diagram showing a configuration example of a service transmission system.

FIG. 2 shows a configuration example of the service transmission system 100. The service transmission system 100 includes a controller 101, a high dynamic range (HDR) opto-electronic converter 102, a standard dynamic range (SDR) opto-electronic converter 103, a selector switch 104, an RGB/YCbCr converter 105, a video encoder 106, a container encoder 107, and a transmitter 108.

The controller 101 includes a central processing unit (CPU) and controls operations of respective sections of the service transmission system 100 according to a control program. The HDR opto-electronic converter 102 applies HDR opto-electronic conversion characteristics to high-contrast camera output, i.e., HDR video data Vh to perform opto-electronic conversion thereon, and obtains HDR transmission video data (transmission video data provided with HDR opto-electronic conversion characteristics). The HDR transmission video data is a video material produced by HDR optical-electro transfer function (OETF).

The SDR opto-electronic converter 103 applies SDR opto-electronic conversion characteristics to normal-contrast camera output, i.e., SDR video data Vs to perform opto-electronic conversion thereon, and obtains SDR transmission video data (transmission video data provided with SDR opto-electronic conversion characteristics). The SDR transmission video data is a video material produced by SDR OETF.

Figure 3:
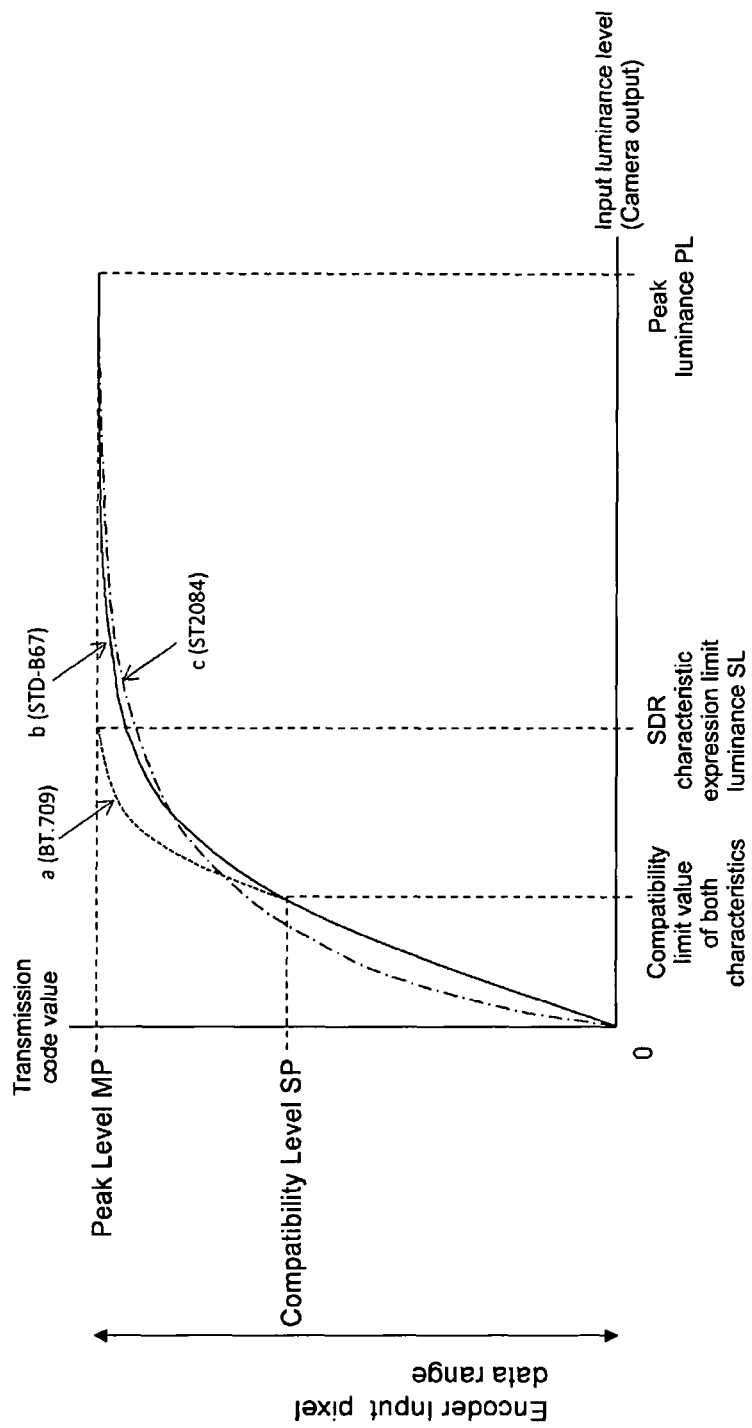
FIG. 3 is a diagram for describing opto-electronic conversion characteristics.

FIG. 3 shows an example of the SDR and HDR opto-electronic conversion characteristics. In FIG. 3, the horizontal axis represents an input luminance level, and the vertical axis represents a transmission code value. A broken line "a" represents SDR opto-electronic conversion characteristics (BT.709: gamma characteristics). A solid line "b" represents STD-B67 (hybrid log-gamma (HLG)) characteristics as the HDR opto-electronic conversion characteristics. A dot-and-dash line "c" represents ST2084 (perceptual quantizer (PQ) curve) characteristics as the HDR opto-electronic conversion characteristics.

The STD-B67 (HLG) characteristics include an area compatible with the SDR optoelectronic conversion characteristics (BT.709: gamma characteristics). In other words, the curves of both of those characteristics coincide with each other in the input luminance level in a range from zero to a compatibility limit value of both the characteristics. When the input luminance level is the compatibility limit value, the transmission code value is a compatibility level SP. The ST2084 (PQ curve) is a curve of a quantization step that corresponds to a high luminance and is appropriate to characteristics of human sight. In the HDR opto-electronic conversion characteristics, when the input luminance level is a peak luminance PL, the transmission code value is a peak level MP.

In the SDR opto-electronic conversion characteristics, when the input luminance level is an SDR characteristic expression limit luminance SL, the transmission code value is the peak level MP. Here, SL is 100 cd/m$^2$.

Referring back to FIG. 2, the selector switch 104 selectively takes out the HDR transmission video data obtained in the HDR opto-electronic converter 102 or the SDR transmission video data obtained in the SDR opto-electronic converter 103. This switching may be performed in units of programs or in units according thereto.

The RGB/YCbCr converter 105 converts transmission video data V1, which is taken out with the selector switch 104, into a YCbCr (luminance and color difference) domain from an RGB domain. It should be noted that the color space domain is not limited to the RGB domain, and the luminance and color difference domain is not limited to the YCbCr domain.

The video encoder 106 perform encoding, such as MPEG4-Advanced Video Coding (AVC) or High Efficiency Video Coding (HEVC), on the transmission video data V1 converted into the YCbCr domain in the RGB/YCbCr converter 105, obtains encoded video data, and generates a video stream (video elementary stream) VS containing the encoded video data.

At that time, the video encoder 106 inserts conversion characteristic information (transferfunction) into an area of video usability information (VUI) of a sequence parameter set (SPS) network abstraction layer (NAL) unit of an access unit (AU). The conversion characteristic information (transferfunction) indicates the opto-electronic conversion characteristics of the transmission video data V1 or electro-optical conversion characteristics corresponding to those characteristics. It should be noted that when the opto-electronic conversion characteristics of the transmission video data V1 are STD-B67 (HLG), the video encoder 106 inserts conversion characteristic information indicating BT.709 (gamma characteristics) in the area of VUI. In this case, the conversion characteristic information indicating STD-B67 (HLG) is disposed in a transfer function supplemental enhancement information (SEI) message (transfer_function SEI message) newly defined, which will be described later.

Further, the video encoder 106 inserts an EOS NAL unit at the end of a first video stream when the first video stream corresponding to a first type of transmission video data V1 is switched to a second video stream corresponding to a second type of transmission video data V1.

Further, the video encoder 106 inserts a transfer function SEI message into, for example, a portion of "Suffix_SEIs" of the access unit (AU). The transfer function SEI message includes conversion characteristic information indicating the opto-electronic conversion characteristics of the transmission video data V1 or the electro-optical conversion characteristics corresponding to those characteristics, and the like.

FIG. 4A shows a structure example (Syntax) of the transfer function SEI message. FIG. 4B shows content (Semantics) of main information in the structure example. An eight-bit field of "transferfunction" indicates the opto-electronic conversion characteristics of the transmission video data V1 or electro-optical conversion characteristics corresponding to those characteristics. When a value of this element and a value of "transferfunction" of the VUI are different from each other, the value of "transferfunction" is replaced with the value of this element.

For example, "1" indicates "BT.709-5 Transfer Function (SDR)", "14" indicates "10 bit BT.2020 Transfer Function (SDR)", "16" indicates "SMPTE 2084 Transfer Function (HDR1)", and "18" indicates "ARIB STD B-67 Transfer Function (HDR2)".

A sixteen-bit field of "peak_luminance" indicates the maximum luminance level. The maximum luminance level indicates the maximum luminance level of content, for example, within a program or a scene. A reception side can use this value as a reference value when a display picture suitable for a display capability is created. An eight-bit field of "color_space" indicates color space information.

Further, the video encoder 106 inserts display switch information into the video stream when the first type of transmission video data V1 is switched to the second type of transmission video data V1. In the case of using the first method, the display switch information is information indicating a recommended period for display switching in the reception device. In this embodiment, the video encoder 106 inserts a display switch SEI message (display_switch SEI message) newly defined, into, for example, a portion of "Suffix_SEIs" of the access unit (AU).

FIG. 5A shows a structure example (Syntax) of the display switch SEI message. FIG. 5B shows content (Semantics) of main information in the structure example. A one-bit field of "alternate_picture_flag" indicates whether using an alternate picture for a display picture is permissible or not. For example, "1" indicates permissible, and "0" indicates impermissible. During a period including a predetermined number of frames after switching (picture period), "1" is set for "alternate_picture_flag", and a recommended period for display switching in the receiver is indicated.

Further, in the case of using the second method, the display switch information is encoded video data (encoded video data of a switching picture) for displaying the reception device in a period for display switching. During a period including a predetermined number of frames after switching (picture period), the encoded video data of a switching picture is inserted instead of the second type of transmission video data. A replacement picture may be displayed before the predetermined number of frames and after the switching.

Referring back to FIG. 2, the container encoder 107 generates a transport stream (MPEG2 transport stream, MMT stream, or ISO base media file format (ISOBMFF) file) containing the video stream VS generated in the video encoder 106. The transmitter 108 transmits the transport stream to the service reception device 200 through broadcasting waves or network packets.

At that time, the container encoder 107 inserts identification information, which indicates a type of transmission video data V1 of the video stream contained in the transport stream, into the transport stream such that a type of transmission video data V1 obtained after switching is indicated at a timing earlier than a switch timing of the type of transmission video data V1 by a predetermined amount of time or more.

Figure 6:
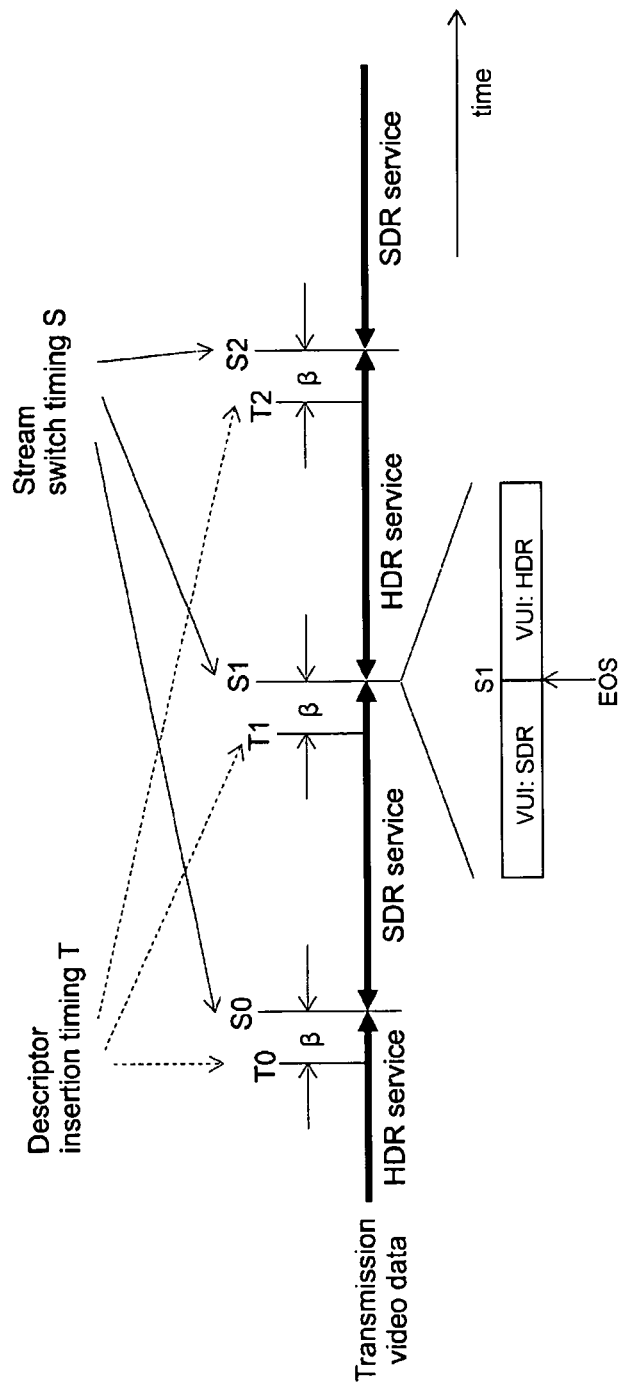

FIG. 6 shows a relationship between a stream switch timing S (S0, S1, S2, . . . ) and a timing T (T0, T1, T2, . . . ) at which identification information for identifying a type of transmission video data after switching is inserted. The stream switch timing S is located between an SDR service and an HDR service. To meet the following expression (1), the timing T is set at a timing earlier than the timing S by β (predetermined amount of time) or more. It should be noted that the example of FIG. 6 shows that S−T=β (where β is a positive value).

$$S-T \geq \beta \quad (1)$$

In this embodiment, the container encoder 107 inserts an HDR descriptor, which is newly defined, into the transport stream. For example, the HDR descriptor is inserted under a program map table (PMT) when the transport stream is an MPEG2 transport stream, and is inserted under an MMT Package Table (MP table) when the transport stream is an MMT stream.

FIG. 7 shows a structure example (Syntax) of the HDR descriptor. FIG. 8 shows content (Semantics) of main information in the structure example. An eight-bit field of "descriptor_tag" indicates a descriptor type, and here, indicates an HDR descriptor. An eight-bit field of "descriptor_length" indicates a length (size) of the descriptor and indicates a byte count subsequent thereto as a length of the descriptor.

A one-bit field of "HDR_SDR_flag" indicates whether a target stream is an HDR stream or an SDR stream. For example, "1" indicates an HDR stream, and "0" indicates an SDR stream. A one-bit field of "characteristics_info_flag" indicates whether characteristic information is present or absent. For example, "1" indicates the presence of characteristic information, and "0" indicates the absence of characteristic information. A one-bit field of "color_space_flag" indicates whether color space information is present or absent. For example, "1" indicates the presence of color space information, and "0" indicates the absence of color, space information.

When "characteristics_info_flag" is "1", an eight-bit field of "transferfunction" is present. This filed indicates opto-electronic conversion characteristics of the transmission video data V1 or electro-optical conversion characteristics corresponding to those characteristics. For example, "1" indicates "BT.709-5 Transfer Function (SDR)", "14" indicates "10 bit BT.2020 Transfer Function(SDR)", "16" indicates "SMPTE 2084 Transfer Function (HDR1)", and "18" indicates "ARIB STD B-67 Transfer Function (HDR2)". Further, when "color_space_flag" is "1", an eight-bit field of "color_space" is present. This field indicates color space information.

Figure 9:
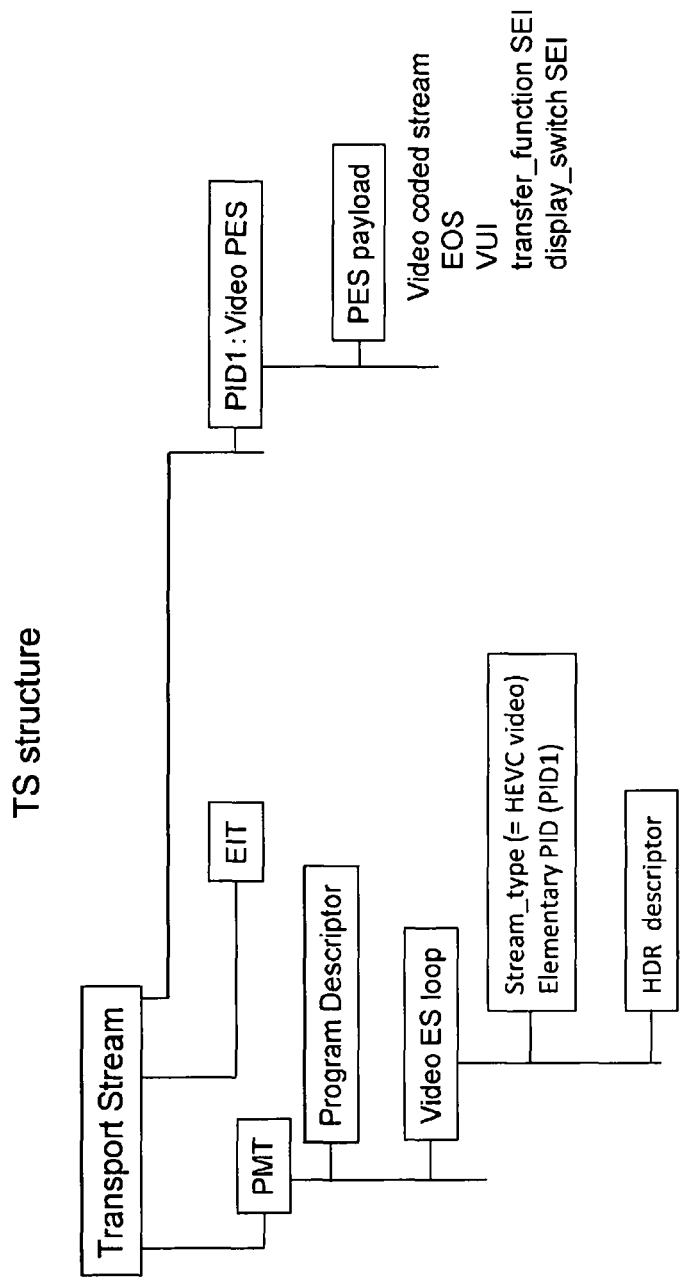
FIG. 9 is a diagram showing an example of a structure of an MPEG2 transport stream (TS structure).

FIG. 9 shows an exemplary structure of an MPEG2 transport stream (TS structure). The exemplary structure is an example in the case of using the first method in which the display switch information is information indicating a recommended period for display switching in the reception device.

In this exemplary structure, "Video PES", which is a packetized elementary stream (PES) packet of the video stream identified as PID1, is present. Conversion characteristic information (transferfunction) indicating opto-electronic conversion characteristics of the transmission video data V1 or electro-optical conversion characteristics corresponding to those characteristics is inserted into the area of VUI of SPS of the access unit (AU).

Further, when the first video stream corresponding to the first type of transmission video data V1 is switched to the second video stream corresponding to the second type of transmission video data V1, an EOS NAL unit is inserted at the end of the first video stream.

Further, the transfer function SEI message (see FIG. 4A) is inserted into, for example, a portion of "Suffix_SEIs" of the access unit (AU). The transfer function SEI message includes the conversion characteristic information indicating the opto-electronic conversion characteristics of the transmission video data V1 or the electro-optical conversion characteristics corresponding to those characteristics, and the like.

Further, the display switch SEI message (see FIG. 5A) for indicating a recommended period for display switching in the reception device is inserted into, for example, a portion of "Suffix_SEIs" of the access unit (AU).

Further, the transport stream TS contains a program map table (PMT) as program specific information (PSI). The PSI is information describing to which program each elementary stream contained in the transport stream belongs. A program loop describing information related to the entire program is present in the PMT.

In the PMT, an elementary stream loop including information related to each elementary stream is present. In this exemplary structure, a video elementary stream loop (video ES loop) corresponding to the video stream is present. In the video ES loop, in order to correspond to the video stream, information such as a stream type and a packet identifier (PID) is disposed, and a descriptor describing information related to the video stream is also disposed.

A value of "Stream_type" of the video stream is set as a value indicating an HEVC video stream, for example. PID information indicates PID1 imparted to a PES packet of the video stream, "video PES". The HDR descriptor described above (see FIG. 7) is inserted as one descriptor.

Though not shown in the figures, in the case of using the second method in which the display switch information is set as encoded video data (encoded video data of a switching picture) for displaying the reception device in a period for display switching, an example of the TS structure is similar to the example of the TS structure described above except that the display switch SEI message is not inserted.

Figure 10:
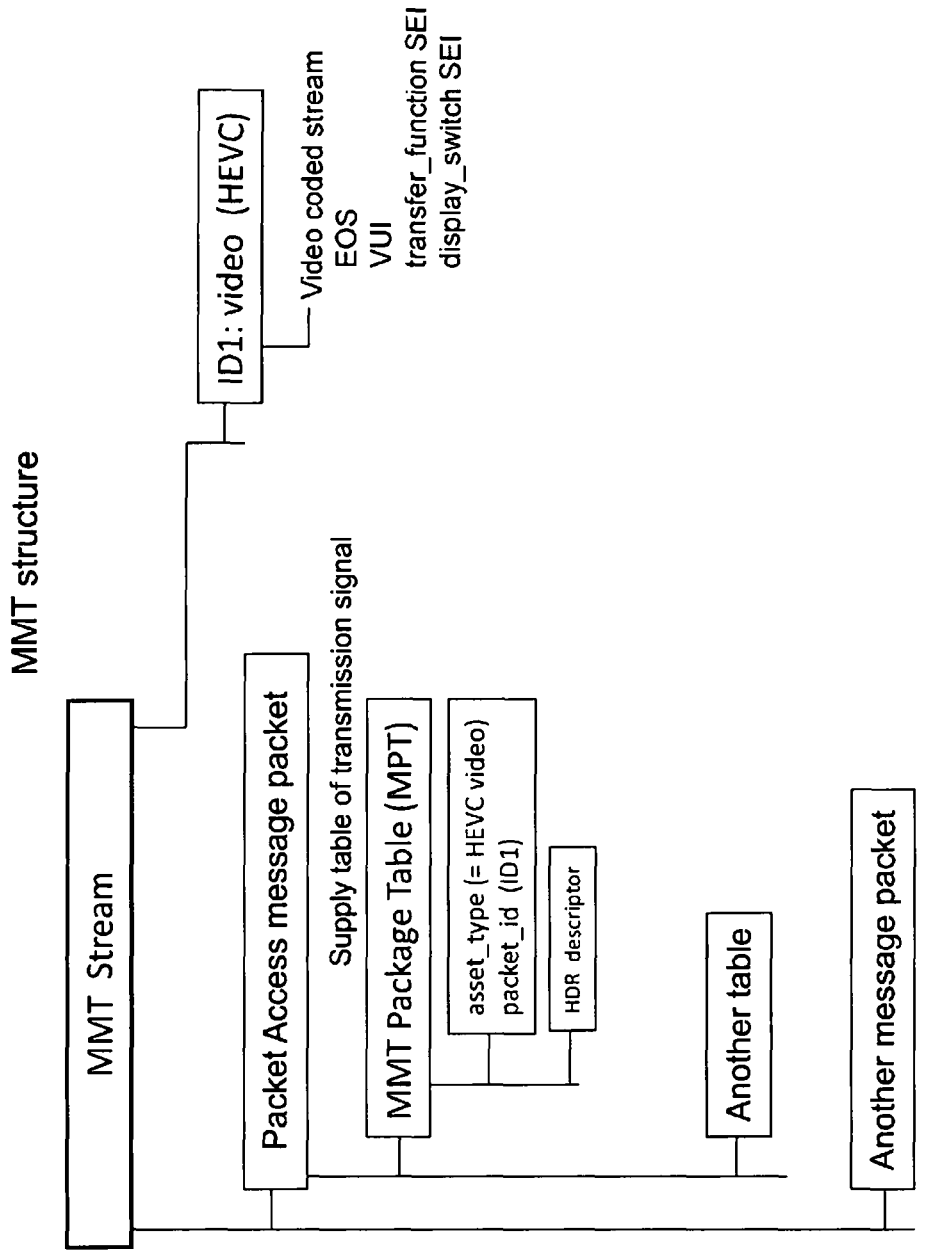
FIG. 10 is a diagram showing an example of a structure of an MPEG media transport (MMT) stream (MMT structure).

FIG. 10 shows an example of a structure of an MMT stream (MMT structure). This exemplary structure shows a case using the first method in which the display switch information is set as information indicating a recommended period for display switching in the reception device.

MMT packets of respective assets such as video and audio are present in the MMT stream. In the exemplary structure shown in FIG. 10, MMT packets of an asset of video, a packet ID of which is identified as ID1, are present. Conversion characteristic information (transferfunction) indicating opto-electronic conversion characteristics of the transmission video data V1 or electro-optical conversion characteristics corresponding to those characteristics is inserted into the area of VUI of SPS of the access unit (AU).

Further, when the first video stream corresponding to the first type of transmission video data V1 is switched to the second video stream corresponding to the second type of transmission video data V1, an EOS NAL unit is inserted at the end of the first video stream.

Further, the transfer function SEI message (see FIG. 4A) is inserted into, for example, a portion of "Suffix_SEIs" of the access unit (AU). The transfer function SEI message includes the conversion characteristic information indicating the opto-electronic conversion characteristics of the transmission video data V1 or the electro-optical conversion characteristics corresponding to those characteristics, and the like.

Further, the display switch SEI message (see FIG. 5A) for indicating a recommended period for display switching in the reception device is inserted into, for example, a portion of "Suffix_SEIs" of the access unit (AU).

Further, the MMT stream contains a message packet such as a packet access (PA) message packet. The PA message packet contains a table such as an MMT Packet (MP) table. The MP table contains information on an asset basis. The HDR descriptor described above (see FIG. 7) is inserted as one descriptor.

Though not shown in the figures, in the case of using the second method in which the display switch information is set as encoded video data (encoded video data of a switching picture) for displaying the reception device in a period for display switching, an example of the MMT structure is similar to the example of the MMT structure described above except that the display switch SEI message is not inserted.

Operations of the service transmission system 100 shown in FIG. 2 will be simply described. HDR video data Vh that is high-contrast camera output is supplied to the HDR opto-electronic converter 102. In the HDR opto-electronic converter 102, the HDR video data Vh is subjected to opto-electronic conversion using HDR optoelectronic conversion characteristics, and HDR transmission video data (transmission video data provided with HDR opto-electronic conversion characteristics) is obtained as a video material produced by HDR OETF.

Further, SDR video data Vs that is normal-contrast camera output is supplied to the SDR opto-electronic converter 103. In the SDR opto-electronic converter 103, the SDR video data Vs is subjected to opto-electronic conversion using SDR optoelectronic conversion characteristics, and SDR transmission video data (transmission video data provided with SDR opto-electronic conversion characteristics) is obtained as a video material produced by SDR OETF.

In the selector switch 104, the HDR transmission video data obtained in the HDR opto-electronic converter 102 or the SDR transmission video data obtained in the SDR opto-electronic converter 103 is selectively taken out under control of the controller 101. The transmission video data V1 thus taken out is converted into a YCbCr (luminance and color difference) domain from an RGB domain in the RGB/YCbCr converter 105.

The transmission video data V1 converted into the YCbCr domain is supplied to the video encoder 106. In the video encoder 106, the transmission video data V1 is subjected to encoding such as MPEG4-AVC or HEVC to obtain encoded video data, so that a video stream VS containing the encoded video data is generated.

At that time, in the video encoder 106, conversion characteristic information (transferfunction) is inserted into an area of VUI of an SPS NAL unit of an access unit (AU). The conversion characteristic information (transferfunction) indicates optoelectronic conversion characteristics of the transmission video data V1 or electrooptical conversion characteristics corresponding to those characteristics.

Further, in the video encoder 106, an EOS NAL unit is inserted at the end of a first video stream when the first video stream corresponding to a first type of transmission video data V1 is switched to a second video stream corresponding to a second type of transmission video data V1.

Further, in the video encoder 106, a transfer function SEI message (see FIG. 4A) is inserted into, for example, a portion of "Suffix_SEIs" of the access unit (AU). The transfer function SEI message includes the conversion characteristic information indicating the opto-electronic conversion characteristics of the transmission video data V1 or the electro-optical conversion characteristics corresponding to those characteristics, and the like.

Further, in the video encoder 106, display switch information is inserted into the video stream when the first type of transmission video data V1 is switched to the second type of transmission video data V1. In the case of using the first method, the display switch information is information indicating a recommended period for display switching in the reception device. In this case, in the video encoder 106, a display switch SEI message (see FIG. 5A) is inserted into, for example, a portion of "Suffix_SEIs" of the access unit (AU).

Further, in the case of using the second method, the display switch information is encoded video data (encoded video data of a switching picture) for displaying the reception device in a period for display switching. In this case, in the video encoder 106, during a period including a predetermined number of frames after switching (picture period), the encoded video data of a switching picture is inserted instead of the second type of transmission video data V1. A replacement picture may be displayed during the period before the predetermined number of frames and after the switching.

The video stream VS obtained in the video encoder 106 is supplied to the container encoder 107. In the container encoder 107, a transport stream (MPEG2 transport stream, MMT stream, or ISOBMFF file) containing the video stream VS generated in the video encoder 106 is generated. The transport stream is transmitted to the service reception device 200 by the transmitter 108 through broadcasting waves or network packets.

At that time, in the container encoder 107, identification information, which indicates a type of transmission video data V1 of the video stream contained in the transport stream serving as a container (multiplexed stream), is inserted into the transport stream such that a type of transmission video data V1 obtained after the switching is indicated at a timing earlier than a switch timing by a predetermined amount of time or more. In this case, in the container encoder 107, the HDR descriptor (see FIG. 7) is inserted into the transport stream.

Configuration Example of Service Reception Device

Figure 11:
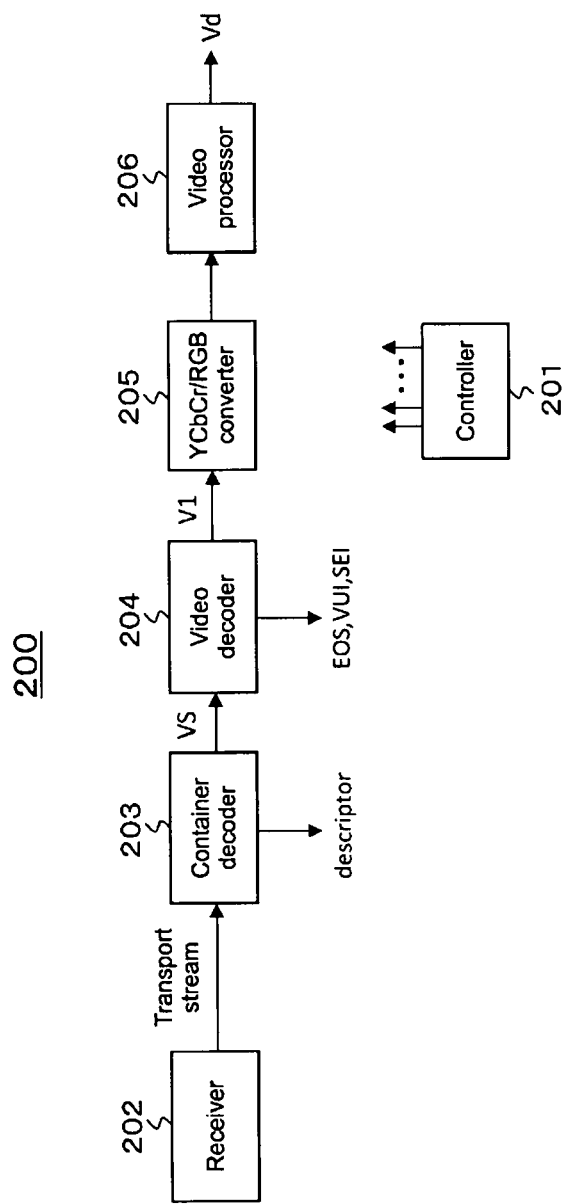
FIG. 11 is a block diagram showing a configuration example of a service reception device.

FIG. 11 shows a configuration example of the service reception device 200. The service reception device 200 includes a controller 201, a receiver 202, a container decoder 203, a video decoder 204, a YCbCr/RGB converter 205, and a video processor 206.

The controller 201 includes a CPU and controls operations of respective sections of the service reception device 200 according to a control program. The receiver 202 receives the transport stream (MPEG2 transport stream, MMT stream, or ISOBMFF file) serving as a container (multiplexed stream), which is transmitted from the service transmission system 100 (see FIG. 2) through broadcasting waves or network packets. The container decoder 203 extracts a video stream VS from the transport stream.

Further, the container decoder 203 extracts various types of information inserted into the transport stream and transmits the information to the controller 201. The extracted information contains the HDR descriptor described above (see FIG. 7). Based on the description of the HDR descriptor, the controller 201 acquires identification information indicating a type of transmission video data V1 of the video stream contained in the transport stream. The identification information also contains conversion characteristic information (transferfunction) indicating opto-electronic conversion characteristics of the transmission video data V1 or electro-optical conversion characteristics corresponding to those characteristics.

As described above, the identification information of the transmission video data V1 is inserted into the transport stream such that a type of transmission video data V1 obtained after switching is indicated at a timing T earlier than a switch timing S of the type of transmission video data V1 by a predetermined amount of time ($\beta$) or more. Thus, the controller 201 can grasp switching between types of transmission video data at a timing earlier than a switch timing by a predetermined amount of time or more and grasp a type of transmission video data after switching.

As a result, the controller 201 can previously make provision for control of the respective sections, which is associated with switching of the type of transmission video data V1, and can smoothly perform display control for obtaining display video data from the transmission video data V1 without delay even when the type of transmission video data V1 is switched.

The video decoder 204 decodes the video stream VS extracted in the container decoder 203 and obtains the transmission video data V1. Further, the video decoder 204 extracts, from the video stream VS, information such as a parameter set and an SEI message inserted into each access unit, and transmits the information to the controller 201.

The extracted information also contains the conversion characteristic information (transferfunction), which is inserted into the area of VUI of the SPS NAL unit of the access unit described above and indicates the opto-electronic conversion characteristics of the transmission video data V1 or the electro-optical conversion characteristics corresponding to those characteristics, and the transfer function SEI message (see FIG. 4A). This enables the controller 201 to easily recognize the type of transmission video data V1 and appropriately perform display control for obtaining display video data from the transmission video data, such as electro-optical conversion, even when the type of transmission video data is switched.

Further, the information extracted in the video decoder 204 also contains extracted information of the EOS NAL unit. As described above, when the first video stream corresponding to the first type of transmission video data V1 is switched to the second video stream corresponding to the second type of transmission video data V1, the EOS NAL unit is inserted at the end of the first video stream. Thus, based on the extracted information of the EOS NAL unit, the controller 201 can more reliably recognize (detect) switching from the first video stream to the second video stream precisely in units of pictures.

The YCbCr/RGB converter 205 converts the transmission video data V1, which is obtained in the video decoder 204, into the RGB domain from the YCbCr (luminance and color difference) domain. It should be noted that the color space domain is not limited to the RGB domain, and the luminance and color difference domain is not limited to the YCbCr domain.

Under control of the controller 201, the video processor 206 performs processing such as color space conversion and electro-optical conversion on the transmission video data V1 converted into the RGB domain and obtains display video data Vd.

Figure 12:
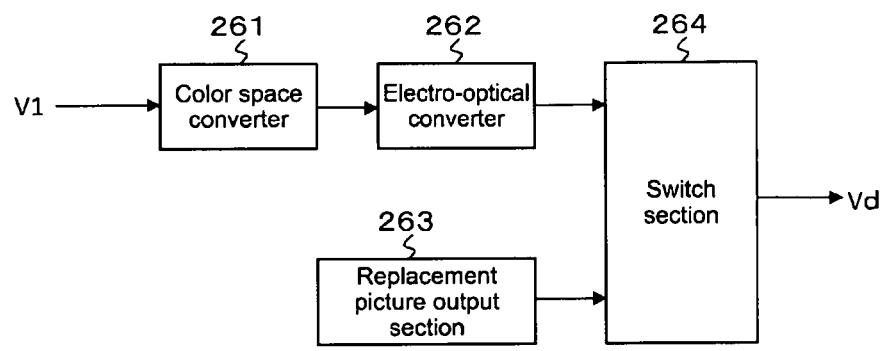
FIG. 12 is a block diagram showing a configuration example of a video processor.

FIG. 12 shows a configuration example of the video processor 206. The video processor 206 includes a color space converter 261, an electro-optical converter 262, a replacement picture output section 263, and a switch section 264.

The color space converter 261 performs processing of color space conversion on the transmission video data V1. Under control of the controller 201, color space conversion characteristics in the color space converter 261 are set using color space information "color_space" corresponding to the transmission video data V1 input to the color space converter 261. The color space information "color_space" is disposed in, for example, the HDR descriptor (see FIG. 7) or the transfer function SEI message (see FIG. 4A). Thus, when the type of transmission video data V1 is switched and the color space information "color_space" is changed, switching of the color space conversion characteristics in the color space converter 261, for example, switching of a conversion table, is performed over a predetermined time from the switch timing S.

The electro-optical converter 262 performs processing of electro-optical conversion on the transmission video data V1 that has passed through the color space converter 261. Under control of the controller 201, electro-optical conversion characteristics in the electro-optical converter 262 are set using conversion characteristic information "transferfunction" corresponding to the transmission video data V1 input to the electrooptical converter 262. The conversion characteristic information "transferfunction" is disposed in, for example, the HDR descriptor (see FIG. 7) or the transfer function SEI message (see FIG. 4A).

Thus, when the type of transmission video data V1 is switched and the conversion characteristic information "transferfunction" is changed, switching of electro-optical conversion characteristics in the electro-optical converter 262, for example, switching of a conversion table, is performed over a predetermined time from the switch timing S.

The replacement picture output section 263 outputs video data for a replacement picture. Here, it is assumed that the replacement picture is a black picture, for example, and the video data for a replacement picture has a luminance code value of "64" (this value represents a black level by 10 bits), for example. The replacement picture output section 263 includes a memory circuit that holds video data for a replacement picture, for example.

When the type of transmission video data V1 is switched, under control of the controller 201, the switch section 264 outputs, as display video data Vd, video data for a replacement picture that is output from the replacement picture output section 263 in a period including a predetermined number of frames from the switch timing S (picture period), or output video data of the electro-optical converter 262 in the other periods.

Here, the period including a predetermined number of frames is assumed as a frame period extending at least until switching of the color space conversion characteristics in the color space converter 261 and switching of the electro-optical conversion characteristics in the electro-optical converter 262 are ended. In such a manner, in the switch section 264, the video data for a replacement picture is selected as display video data Vd in the period including a predetermined number of frames from the switch timing S. This can prevent a distorted picture from being displayed, the distorted picture resulting from a switching transition of the conversion characteristics in the color space converter 261 or the electro-optical converter 262, and can reduce discomfort caused in the display picture.

Operations of the service reception device 200 shown in FIG. 11 will be simply described. In the receiver 202, the transport stream (MPEG2 transport stream, MMT stream, or ISOBMFF file) transmitted from the service transmission system 100 through broadcasting waves or network packets is received. The transport stream is supplied to the container decoder 203. In the container decoder 203, a video stream VS is extracted from the transport stream.

Further, in the container decoder 203, various types of information inserted into the transport stream are extracted and transmitted to the controller 201. The extracted information also contains the HDR descriptor (see FIG. 7). Based on the description of the HDR descriptor, in the controller 201, identification information indicating a type of transmission video data V1 of the video stream contained in the transport stream is acquired at a timing T earlier than a switch timing S for the type of transmission video data V1 by a predetermined amount of time ($\beta$) or more.

The video stream VS extracted in the container decoder 203 is supplied to the video decoder 204. In the video decoder 204, the video stream VS is decoded to obtain the transmission video data V1. Further, in the video decoder 204, information such as a parameter set and an SEI message inserted into each access unit is extracted from the video stream VS and transmitted to the controller 201.

The extracted information also contains the conversion characteristic information (transferfunction), which is inserted into the area of VUI of the SPS NAL unit of the access unit described above and indicates the opto-electronic conversion characteristics of the transmission video data V1 or the electro-optical conversion characteristics corresponding to those characteristics, and the transfer function SEI message (see FIG. 4A). As a result, in the controller 201, identification information indicating the type of transmission video data V1 is acquired.

Further, the extracted information also contains extracted information of the EOS NAL unit. As a result, based on the extracted information of the EOS NAL unit, a switch timing S of the video stream is recognized precisely in units of pictures in the controller 201.

The transmission video data V1 obtained in the video decoder 204 is converted into the RGB domain from the YCbCr (luminance and color difference) domain in the YCbCr/RGB converter 205, and then supplied to the video processor 206. In the video processor 206, under control of the controller 201, processing such as color space conversion, electro-optical conversion, and replacement with a replacement picture is performed on the transmission video data V1, and display video data Vd is obtained. The display video data Vd is supplied to a monitor (not shown), so that picture display is performed.

Figure 13:
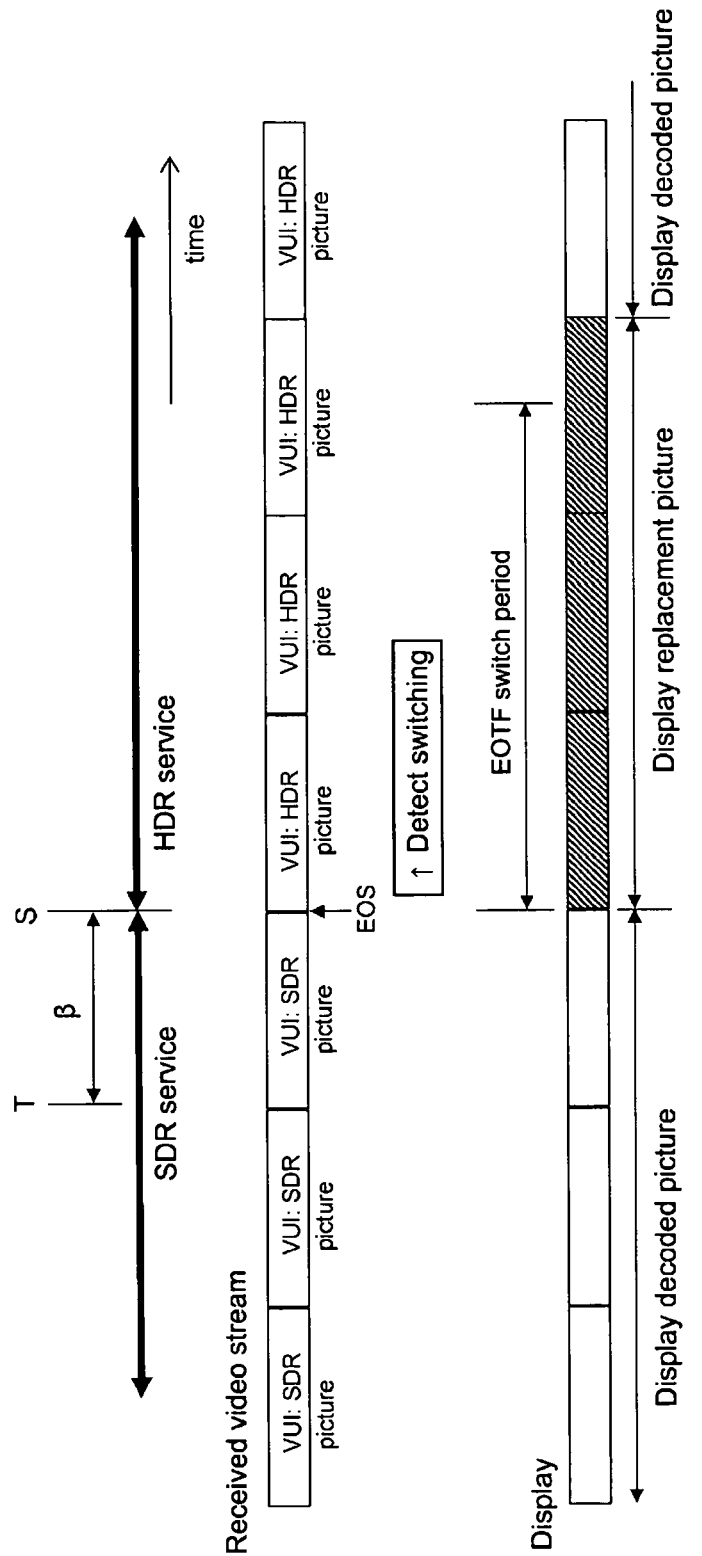
FIG. 13 is a diagram for describing a control operation of a controller for the video processor.

A control operation of the controller 201 for the video processor 206 will be described with reference to FIG. 13. In the example shown in FIG. 13, an SDR service is switched to an HDR service at a stream switch timing S. The HDR descriptor (see FIG. 7) is inserted at a timing earlier than the stream switch timing S by $\beta$. Further, the EOS NAL unit is inserted at the end of the video stream of the SDR service.

Further, in the received video stream, the conversion characteristic information "transferfunction", which is inserted into the area of VUI of the SPS NAL unit of the access unit (AU), indicates SDR conversion characteristics before the timing S, and indicates HDR conversion characteristics after the timing S.

(1) Based on the HDR descriptor inserted into the transport stream, the controller 201 previously detects information indicating that switching from the SDR service to the HDR service occurs.

(2) The controller 201 checks the identification information of the video stream. Here, the controller 201 detects an HDR or SDR conversion type on the basis of the conversion characteristic information "transferfunction" inserted into the area of VUI. Further, the controller 201 detects a stream switch timing S on the basis of the inserted information of the EOS NAL unit. The controller 201 checks the conversion characteristic information "transferfunction" inserted into the area of VUI at both timings before and after the position at which the EOS NAL unit is inserted. When detecting a stream switch timing S, the controller 201 starts switching of the conversion characteristics of the color space conversion or electro-optical conversion (EOTF). It should be noted that the conversion characteristic information "transferfunction" described above can also be recognized by the controller 201 referring to the transfer function SEI message instead of the VUI.

(3) The controller 201 outputs, as display video data Vd, video data for a replacement picture instead of video data of a decoded picture (output video data of the electrooptical converter 262), during a frame period at least from the start of switching of the conversion characteristics to the end thereof (picture period).

As a result, a decoded picture is displayed in a period extending to the stream switch timing S, a replacement picture is displayed in a frame period from the stream switch timing S to the end of switching of the conversion characteristics, and a decoded picture is displayed in a subsequent period. In the example shown in FIG. 13, an EOTF switch period extends over a period of three frames after the stream switching, and a display picture in the period of those three frames is assumed as a replacement picture.

Figure 14:
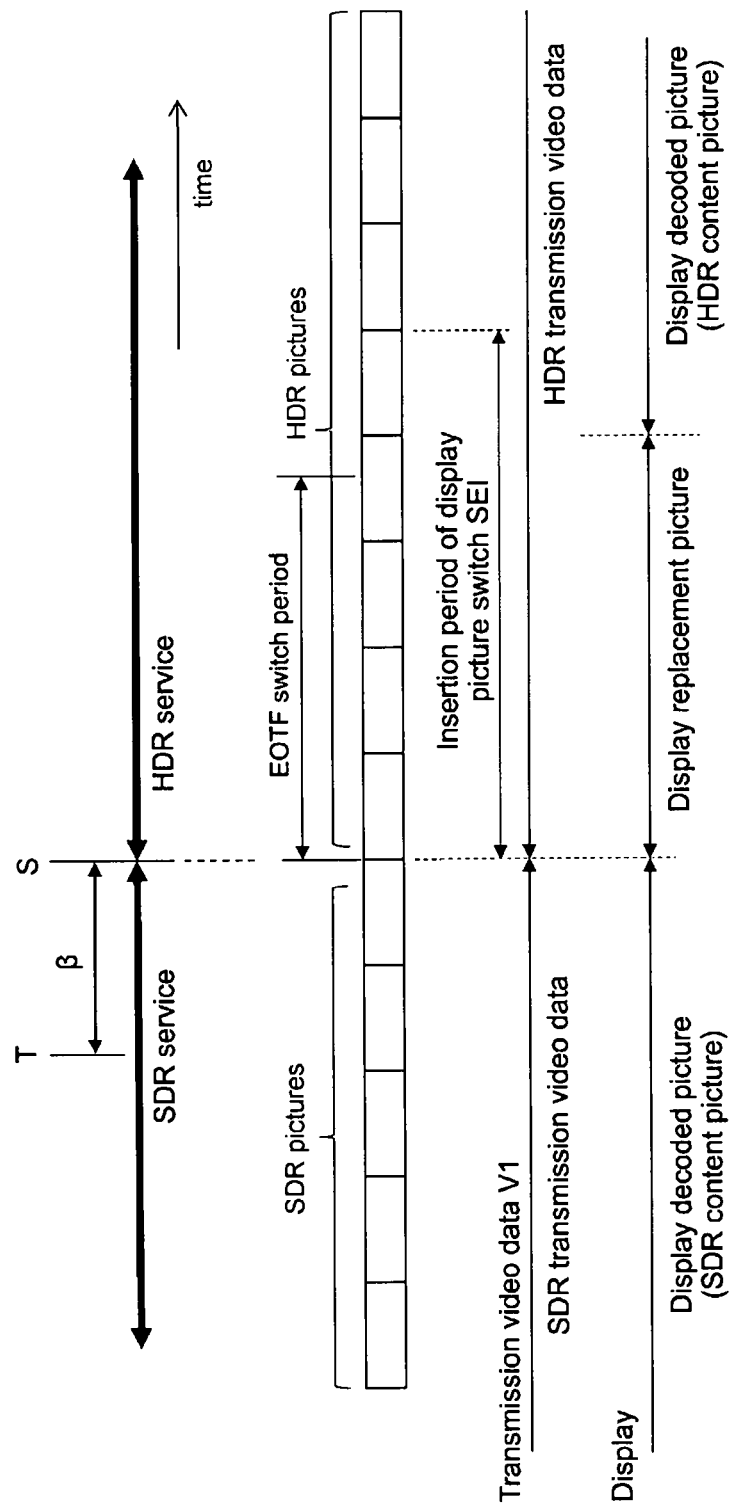
FIG. 14 is a diagram for describing an exemplary change of a display picture at switching in the case of using a first method in which display switch information is set as information indicating a recommended period for display switching in a reception device.

An exemplary change of the display picture at switching in the case of using the first method will be described with reference to FIG. 14. In the first method, the display switch information is information indicating a recommended period for display switching in the reception device. FIG. 14 shows an example in which the SDR service is switched to the HDR service at the stream switch timing S, similarly to FIG. 13.

In the example shown in FIG. 14, the transmission video data V1 is: before the timing S, SDR transmission video data as encoded video data of content pictures; and after the timing S, HDR transmission video data as encoded video data of content pictures. After the switching, during a period including a predetermined number of frames (picture period), "alternate_picture_flag" of the transfer function SEI message (see FIG. 5A) is set to "1", and a recommended period for display switching in the reception device, i.e., an insertion period of display picture switch SEI, is indicated.

In the example shown in FIG. 14, the recommended period for display switching in the reception device is set to a period of five frames after switching. In the example shown in FIG. 14, the EOTF switch period extends over a period of four frames after switching, and display pictures in this period of four frames are set to replacement pictures. It should be noted that a period in which a display picture is set to a replacement picture may be constantly made equal to the recommended period for display switching in the reception device. In this case, if the EOTF switch period varies depending on the reception device, the replacement pictures are constantly displayed in a certain period only.

Figure 15:
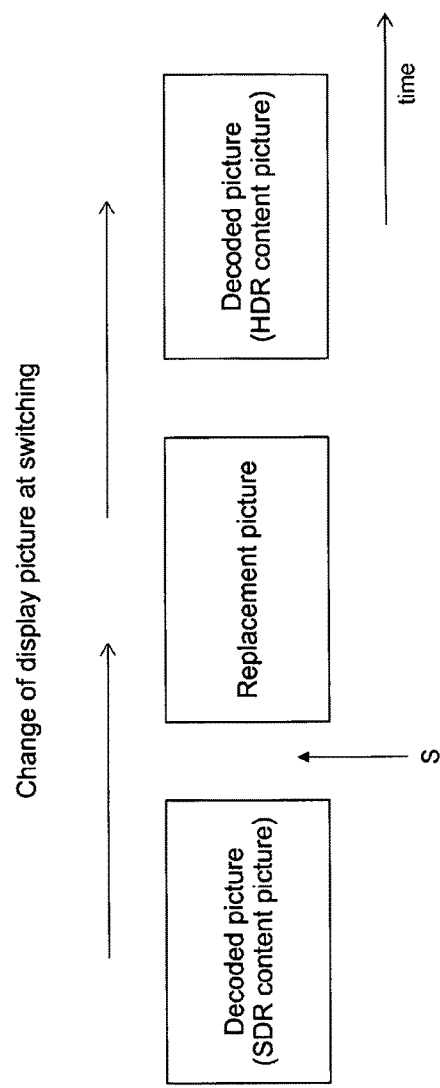
FIG. 15 is a diagram showing an exemplary change of a display picture at switching in the case of using the first method.

When the first method is used in such a manner, decoded pictures (SDR content pictures) are displayed in a period extending to the stream switch timing S, replacement pictures are displayed in a frame period from the stream switch timing S to, for example, the end of switching of the conversion characteristics, and decoded pictures of content (HDR content pictures) are displayed in a subsequent period. FIG. 15 shows an exemplary change of the display picture at switching in the above case.

Figure 16:
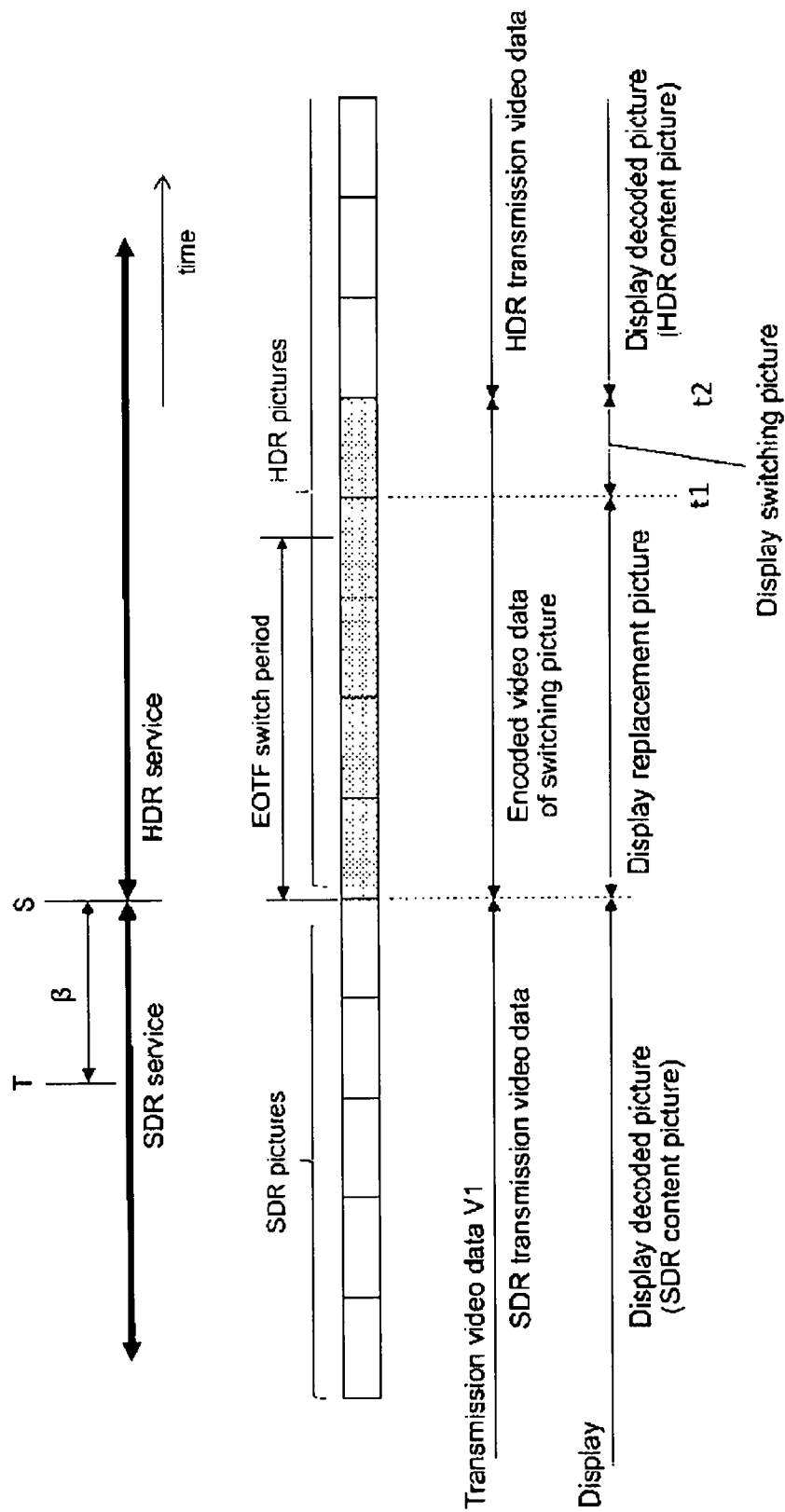
FIG. 16 is a diagram for describing an exemplary change of a display picture at switching in the case of using a second method in which the display switch information is set as encoded video data (encoded video data of a switching picture) for displaying a reception device in a period for display switching.

An exemplary change of the display picture at switching in the case of using the second method will be described with reference to FIG. 16. In the second method, the display switch information is encoded video data (encoded video data of a switching picture) for displaying the reception device in a period for display switching. FIG. 16 shows an example in which the SDR service is switched to the HDR service at the stream switch timing S, similarly to FIG. 13.

In the example shown in FIG. 16, the transmission video data V1 is: before the timing S, SDR transmission video data as encoded video data of content pictures; in a period of a predetermined number of frames after the timing S (picture period), encoded video data of switching pictures; and after the picture period, HDR transmission video data as encoded video data of content pictures. In the example shown in FIG. 16, the period of encoded video data of switching pictures is set to a period of five frames after switching. In this example, the EOTF switch period extends over a period of four frames after switching of the stream, and display pictures in this period of four frames are set to replacement pictures.

Figure 17:
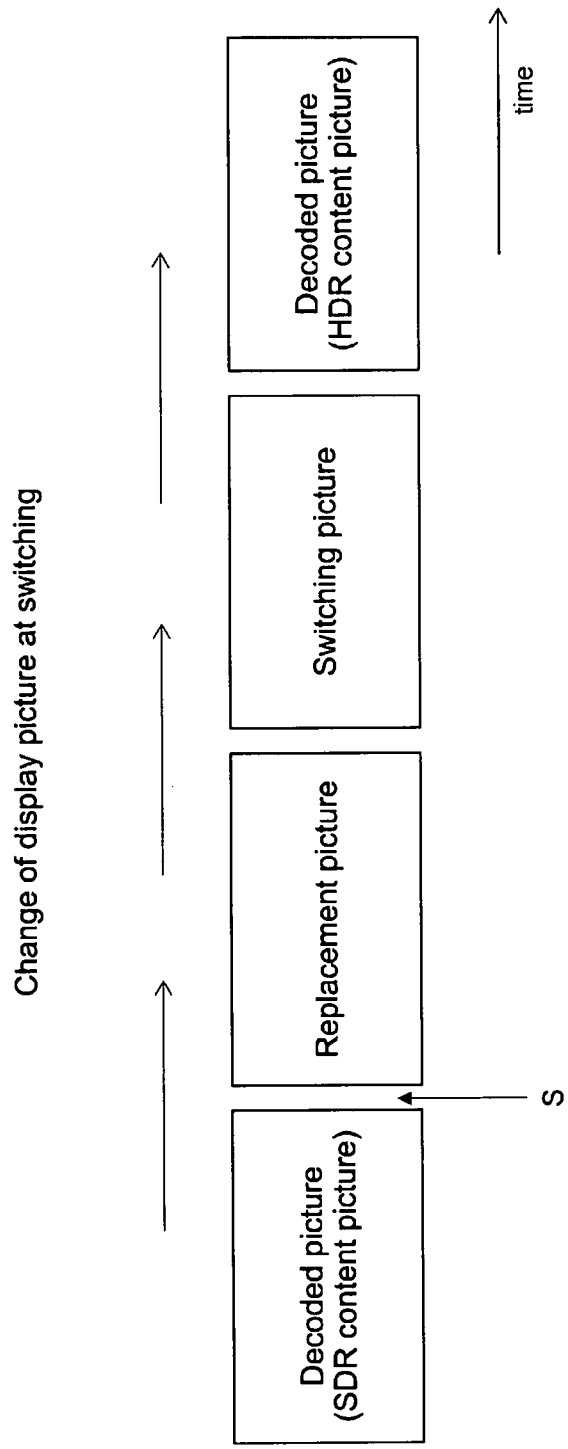
FIG. 17 is a diagram showing an exemplary change of a display picture at switching in the case of using the second method.

When the second method is used in such a manner, decoded pictures (SDR content pictures) are displayed in a period extending to the stream switch timing S, replacement pictures are displayed in a frame period from the stream switch timing S to, for example, the end of switching of the conversion characteristics, switching pictures are displayed in a period in which encoded video data of switching pictures are present in a subsequent period, and decoded pictures (HDR content pictures) are displayed in another subsequent period. FIG. 17 shows an exemplary change of the display picture at switching in the above case.

When the second method is used in such a manner, and when an end timing t1 of a period for outputting the video data of the replacement pictures, which serves as the display video data Vd, is not matched with an end timing t2 of a period for inserting encoded video data of switching pictures, display is transferred from the replacement picture to the switching picture, and then to the decoded picture (HDR content picture). Also in this case, when the replacement picture and the switching picture are matched in luminance level, display without discomfort can be performed. Specifically, when the replacement picture and the switching picture are pictures having, for example, a luminance code value of "64" (this value represents a black level by 10 bits), display without discomfort can be performed.

As described above, in the transmission and reception system 10 shown in FIG. 1, the service transmission system 100 inserts, into a video stream, identification information indicating the type of transmission video data of the video stream. Thus, on the reception side, the type of transmission video data can be easily recognized, and even when the type of transmission video data is switched, video processing for obtaining display video data from the transmission video data, such as electro-optical conversion, can be appropriately performed.

Further, in the transmission and reception system 10 shown in FIG. 1, when the first video stream corresponding to the first type of transmission video data is switched to the second video stream corresponding to the second type of transmission video data, the service transmission system 100 inserts an EOS NAL unit at the end of the first video stream. In this case, the EOS NAL unit functions as an explicit switch signal. The reception side can more reliably recognize (detect) switching from the first video stream to the second video stream.

Furthermore, in the transmission and reception system 10 shown in FIG. 1, when the first type of transmission video data is switched to the second type of transmission video data, the service transmission system 100 inserts display switch information into the video stream. This can facilitate display switching on the reception side.

For example, in the case of using the first method in which the display switch information is information indicating a recommended period for display switching in the reception device, the reception side can recognize the recommended period for display switching. For example, during this period, switching of opto-electronic conversion characteristics is ended, and during the switching of the opto-electronic conversion characteristics, video data of a replacement picture is output as display video data. This can reduce discomfort caused in the display picture.

Further, for example, in the case of using the second method in which the display switch information is encoded video data for displaying the reception device in a period for display switching, when switching of opto-electronic conversion characteristics is ended and when display video data is switched from video data of a replacement picture to video data subjected to opto-electronic conversion on the reception side, an identical specific pattern picture, for example, a black picture, can be displayed in a certain period if the switch period for the opto-electronic conversion characteristics varies.

Furthermore, in the transmission and reception system 10 shown in FIG. 1, the service transmission system 100 inserts identification information, which indicates a type of transmission video data of the video stream contained in the transport stream serving as a container (multiplexed stream), into the transport stream such that the type of transmission video data obtained after the switching is indicated at a timing earlier than a switch timing of the type of the transmission video data by a predetermined amount of time or more. Thus, the reception side can grasp switching between types of transmission video data at a timing earlier than a switch timing by a predetermined amount of time or more and grasp a type of transmission video data after switching, and also smoothly perform display control for obtaining display video data from transmission video data without delay even when a type of transmission video data is switched.

Additionally, in the transmission and reception system 10 shown in FIG. 1, the service reception device 200 processes the transmission video data on the basis of the identification information indicating the type of transmission video data of the video stream, the identification information being inserted into the video stream, and then obtains display video data. Thus, even when the type of transmission video data is switched, video processing for obtaining display video data from the transmission video data, such as electro-optical conversion, can be appropriately performed.

Moreover, in the transmission and reception system 10 shown in FIG. 1, the service reception device 200 outputs video data of a replacement picture to be display video data, during a period from when the first type of transmission video data is switched to the second type of transmission video data to at least when switching of electro-optical conversion characteristics of an electro-optical converter or the like is ended. Thus, this can prevent a distorted picture from being displayed, the distorted picture resulting from a switching transition of conversion characteristics, and can reduce discomfort caused in the display picture.

2. Modified Example

It should be noted that the above embodiment has described the transmission and reception system 10 including the service transmission system 100 and the service reception device 200, but the configuration of the transmission and reception system to which the present technology can be applied is not limited thereto. For example, the service reception device 200 may have a configuration including a set-top box (STB) and a monitor connected with a digital interface such as a high-definition multimedia interface (HDMI). It should be noted that "HDMI" is a registered trademark.

Further, the present technology can have the following configurations.

(1) A transmission apparatus, including circuitry configured to generate a video stream that switches between transmission video data of a plurality of types, each of the plurality of types of the transmission video data having a different predetermined opto-electronic conversion characteristic; and insert identification information into the video stream, the identification information indicating the type of one of the transmission video data included in the video stream.

(2) The transmission apparatus according to feature (1), further including a transmitter configured to transmit a multiplexed stream that includes the video stream, in which the multiplexed stream includes one of an MPEG-2 transport stream, an MPEG media transport (MMT) stream, or an ISO base media file format (ISOBMFF).

(3) The transmission apparatus according to feature (1) or (2), in which the identification information includes conversion characteristic information, the conversion characteristic information indicating one of an opto-electronic conversion characteristic of the one of the transmission video data and an electro-optical conversion characteristic corresponding to the opto-electronic conversion characteristic.

(4) The transmission apparatus according to feature (3), in which the circuitry is configured to insert the conversion characteristic information into at least one of an area of a sequence parameter set (SPS) network abstraction layer (NAL) unit and an area of a supplemental enhancement information (SEI) NAL unit.

(5) The transmission apparatus according to any of features (1) to (4), in which the circuitry is configured to insert display switch information at an end of a first portion of the video stream when the first portion of the video stream corresponding to a first type of the transmission video data is switched to a second portion of the video stream corresponding to a second type of the transmission video data.

(6) The transmission apparatus according to feature (5), in which the display switch information is an End of Sequence (EOS) NAL unit.

(7) The transmission apparatus according to any of features (1) to (4), in which the circuitry is configured to insert display switch information into the video stream when a first portion of the video stream corresponding to a first type of the transmission video data is switched to a second portion of the video stream corresponding to a second type of the transmission video data.

(8) The transmission apparatus according to feature (7), in which the display switch information indicates a predetermined period for display of a replacement picture during switching of a display from the first type of the transmission video data to the second type of the transmission video data in a reception device.

(9) The transmission apparatus according to feature (8), in which the replacement picture is a black picture.

(10) The transmission apparatus according to any of features (7) to (9), in which the display switch information includes encoded video data for display at a reception device in a period for switching a display from the first type of the transmission video data to the second type of the transmission video data.

(11) The transmission apparatus according to feature (2), in which the circuitry is configured to insert the identification information into the multiplexed stream, the identification information indicating the type of the one of the transmission video data included in the video stream contained in the multiplexed stream, such that the type of the one of the transmission video data obtained after switching is indicated at a timing earlier than a timing of the switch to the type of the one of the transmission video data by a predetermined amount of time or more.

(12) A transmission method, including generating, by circuitry of a transmission apparatus, a video stream that switches between transmission video data of a plurality of types, each of the plurality of types of the transmission video data having a different predetermined opto-electronic conversion characteristic; and inserting, by the circuitry, identification information into the video stream, the identification information indicating the type of one of the transmission video data included in the video stream.

(13) The transmission method according to feature (12), further including transmitting, by a transmitter, a multiplexed stream that includes the video stream, in which the multiplexed stream includes one of an MPEG-2 transport stream, an MPEG media transport (MMT) stream, or an ISO base media file format (ISOBMFF).

(14) A reception apparatus, including a receiver configured to receive identification information and a video stream that switches between transmission video data of a plurality of types, each of the plurality of types of the transmission video data having different predetermined opto-electronic conversion characteristics, the identification information indicating the type of one of the transmission video data included in the video stream and being inserted into the video stream; and circuitry configured to decode the video stream to obtain the one of the transmission video data; and process the one of the transmission video data based on the identification information to obtain video data for display.

(15) The reception apparatus according to feature (14), in which the receiver is configured to receive a multiplexed stream that includes the video stream, and the multiplexed stream includes one of an MPEG-2 transport stream, an MPEG media transport (MMT) stream, or an ISO base media file format (ISOBMFF).

(16) The reception apparatus according to feature (14) or (15), in which the identification information includes conversion characteristic information, the conversion characteristic information indicating one of an opto-electronic conversion characteristic of the one of the transmission video data and an electro-optical conversion characteristic corresponding to the opto-electronic conversion characteristic, and the circuitry includes an electro-optical converter that performs electro-optical conversion on the one of the transmission video data based on the conversion characteristic information.

(17) The reception apparatus according to any of features (14) to (16), in which the circuitry is configured to output, as the video data for display, output replacement video data instead of output video data of the electro-optical converter, in a period from when a first type of the transmission video data is switched to a second type of the transmission video data to at least when switching of electro-optical conversion characteristics of the electro-optical converter is completed.

(18) A reception method, including receiving, by a receiver of the reception apparatus, identification information and a video stream that switches between transmission video data of a plurality of types, each of the plurality of types of the transmission video data having different predetermined opto-electronic conversion characteristics, the identification information indicating the type of one of the transmission video data included in the video stream and being inserted into the video stream; decoding the video stream to obtain the one of the transmission video data; and processing, by circuitry of the reception apparatus, the one of the transmission video data based on the identification information to obtain video data for display.

(19) The reception method according to feature (18), in which the step of receiving includes receiving a multiplexed stream including the video stream, the multiplexed stream includes one of an MPEG-2 transport stream, an MPEG media transport (MMT) stream, or an ISO base media file format (ISOBMFF).

(20) A system, including a transmission apparatus, including first circuitry configured to generate a video stream that switches between transmission video data of a plurality of types, each of the plurality of types of the transmission video data having a different predetermined opto-electronic conversion characteristic; and insert identification information into the video stream, the identification information indicating the type of one of the transmission video data included in the video stream; and a reception apparatus, including a receiver configured to receive the video stream and the identification information inserted into the video stream, and second circuitry configured to decode the video stream to obtain the one of the transmission video data, and process the one of the transmission video data based on the identification information to obtain video data for display.

A main feature of the present technology is as follows: identification information indicating a type of transmission video data of a video stream is inserted into the video stream, and thus on the reception side, the type of transmission video data can be easily recognized, and even when the type of transmission video data is switched, video processing for obtaining display video data from the transmission video data, such as electro-optical conversion, can be appropriately performed (see FIGS. 6 and 9).

It should be understood by those skilled in the art that various modifications, combinations, sub-combinations and alterations may occur depending on design requirements and other factors insofar as they are within the scope of the appended claims or the equivalents thereof.

REFERENCE SIGNS LIST 10 transmission and reception system
100 service transmission system
101 controller
102 HDR opto-electronic converter
103 SDR opto-electronic converter
104 selector switch
105 RGB/YCbCr converter
106 video encoder
107 container encoder
108 transmitter
200 service reception device
201 controller
202 receiver
203 container decoder
204 video decoder
205 YCbCr/RGB converter
206 video processor
261 color space converter
262 electro-optical converter
263 replacement picture output section
264 switch section

The invention claimed is:

1. A transmission apparatus, comprising:
circuitry configured to
generate a video stream that switches between transmission video data of a plurality of types, each of the plurality of types of the transmission video data having a different predetermined opto-electronic conversion characteristic,
insert identification information into the video stream, the identification information indicating the type of one of the transmission video data included in the video stream, and
insert display switch information that includes switching picture data of a switching picture into the video stream when a first portion of the video stream corresponding to the transmission video data of a first type of the plurality of types is switched to a second portion of the video stream corresponding to the transmission video data of a second type of the plurality of types, the switching picture being displayed during a switch period between display of the transmission video data of the first type and the transmission video data of the second type; and a transmitter configured to transmit a multiplexed stream that includes the video stream, wherein the multiplexed stream includes one of an MPEG-2 transport stream, an MPEG media transport (MMT) stream, or an ISO base media file format (ISOBMFF), the identification information includes conversion characteristic information, the conversion characteristic information indicating an opto-electronic conversion characteristic of the one of the transmission video data or an electro-optical conversion characteristic corresponding to the opto-electronic conversion characteristic, the display switch information includes encoded video data for display at a reception device in the switch period for switching the display from the first type of the transmission video data to the second type of the transmission video data, the conversion characteristic information is inserted into at least one of an area of a sequence parameter set (SPS) network abstraction layer (NAL) unit and an area of a supplemental enhancement information (SEI) NAL unit, and the identification information is inserted into the multiplexed stream, the identification information indicating the type of the one of the transmission video data included in the video stream contained in the multiplexed stream, such that the type of the one of the transmission video data obtained after switching is indicated at a timing earlier than a timing of the switch to the type of the one of the transmission video data.

2. The transmission apparatus according to claim 1, wherein
the display switch information indicates a predetermined period for display of the switching picture during switching of the display from the first type of the transmission video data to the second type of the transmission video data in the reception device.

3. The transmission apparatus according to claim 2, wherein
the switching picture is a black picture.

4. A transmission method, comprising:
generating, by circuitry of a transmission apparatus, a video stream that switches between transmission video data of a plurality of types, each of the plurality of types of the transmission video data having a different predetermined opto-electronic conversion characteristic;

inserting, by the circuitry, identification information into the video stream, the identification information indicating the type of one of the transmission video data included in the video stream;

inserting, by the circuitry, display switch information that includes switching picture data of a switching picture into the video stream when a first portion of the video stream corresponding to the transmission video data of a first type of the plurality of types is switched to a second portion of the video stream corresponding to the transmission video data of a second type of the plurality of types, the switching picture being displayed during a switch period between display of the transmission video data of the first type and the transmission video data of the second type; and transmitting, by a transmitted, a multiplexed stream that includes the video stream, wherein the multiplexed stream includes one of an MPEG-2 transport stream, an MPEG media transport (MMT) stream, or an ISO base media file format (ISOBMFF), the identification information includes conversion characteristic information, the conversion characteristic information indicating an opto-electronic conversion characteristic of the one of the transmission video data or an electro-optical conversion characteristic corresponding to the opto-electronic conversion characteristic, the display switch information includes encoded video data for display at a reception device in the switch period for switching the display from the first type of the transmission video data to the second type of the transmission video data, the conversion characteristic information is inserted into at least one of an area of a sequence parameter set (SPS) network abstraction layer (NAL) unit and an area of a supplemental enhancement information (SEI) NAL unit, and the identification information is inserted into the multiplexed stream, the identification information indicating the type of the one of the transmission video data included in the video stream contained in the multiplexed stream, such that the type of the one of the transmission video data obtained after switching is indicated at a timing earlier than a timing of the switch to the type of the one of the transmission video data.

5. The transmission method according to claim 4, wherein
the display switch information indicates a predetermined period for display of the switching picture during switching of the display from the first type of the transmission video data to the second type of the transmission video data in the reception device.

6. The transmission method according to claim 5, wherein
the switching picture is a black picture.

7. A reception apparatus, comprising:
a receiver configured to receive identification information, display switch information, and a multiplexed stream that includes a video stream that switches between transmission video data of a plurality of types, each of the plurality of types of the transmission video data having different predetermined opto-electronic conversion characteristics, the identification information indicating the type of one of the transmission video data included in the video stream and being inserted into the video stream when a first portion of the video stream corresponding to the transmission video data of a first type of the plurality of types is switched to a second portion of the video stream corresponding to the transmission video data of a second type of the plurality of types; and circuitry configured to
decode the video stream to obtain the one of the transmission video data;
display a switching picture based on switching picture data included in the display switch information, the switching picture being displayed during a switch period between display of the transmission video data of the first type and the transmission video data of the second type; and
process the one of the transmission video data based on the identification information to obtain video data for display, wherein the multiplexed stream includes one of an MPEG-2 transport stream, an MPEG media transport (MMT) stream, or an ISO base media file format (ISOBMFF), the identification information includes conversion characteristic information, the conversion characteristic information indicating an opto-electronic conversion characteristic of the one of the transmission video data or an electro-optical conversion characteristic corresponding to the opto-electronic conversion characteristic, the display switch information includes encoded video data for display in the switch period for switching the display from the first type of the transmission video data to the second type of the transmission video data, the conversion characteristic information is inserted into at least one of an area of a sequence parameter set (SPS) network abstraction layer (NAL) unit and an area of a supplemental enhancement information (SEI) NAL unit, and the identification information is inserted into the multiplexed stream, the identification information indicating the type of the one of the transmission video data included in the video stream contained in the multiplexed stream, such that the type of the one of the transmission video data obtained after switching is indicated at a timing earlier than a timing of the switch to the type of the one of the transmission video data.

8. The reception apparatus according to claim 7, wherein the circuitry includes an electro-optical converter that performs electro-optical conversion on the one of the transmission video data based on the conversion characteristic information.

9. The reception apparatus according to claim 8, wherein the circuitry is configured to output, as the video data for display, the encoded video data instead of output video data of the electro-optical converter, in the switch period from when the first type of the transmission video data is switched to the second type of the transmission video data to at least when switching of electro-optical conversion characteristics of the electro-optical converter is completed, the encoded video data including the switching picture.

10. A reception method, comprising:

receiving, by a receiver of a reception apparatus, identification information, display switch information, and a multiplexed stream that includes a video stream that switches between transmission video data of a plurality of types, each of the plurality of types of the transmission video data having different predetermined opto-electronic conversion characteristics, the identification information indicating the type of one of the transmission video data included in the video stream and being inserted into the video stream when a first portion of the video stream corresponding to the transmission video data of a first type of the plurality of types is switched to a second portion of the video stream corresponding to the transmission video data of a second type of the plurality of types;

decoding the video stream to obtain the one of the transmission video data;

displaying a switching picture based on switching picture data included in the display switch information, the switching picture being displayed during a switch period between display of the transmission video data of the first type and the transmission video data of the second type; and processing, by circuitry of the reception apparatus, the one of the transmission video data based on the identification information to obtain video data for display, wherein the multiplexed stream includes one of an MPEG-2 transport stream, an MPEG media transport (MMT) stream, or an ISO base media file format (ISOBMFF), the identification information includes conversion characteristic information, the conversion characteristic information indicating an opto-electronic conversion characteristic of the one of the transmission video data or an electro-optical conversion characteristic corresponding to the opto-electronic conversion characteristic, the display switch information includes encoded video data for display in the switch period for switching the display from the first type of the transmission video data to the second type of the transmission video data, the conversion characteristic information is inserted into at least one of an area of a sequence parameter set (SPS) network abstraction layer (NAL) unit and an area of a supplemental enhancement information (SEI) NAL unit, and the identification information is inserted into the multiplexed stream, the identification information indicating the type of the one of the transmission video data included in the video stream contained in the multiplexed stream, such that the type of the one of the transmission video data obtained after switching is indicated at a timing earlier than a timing of the switch to the type of the one of the transmission video data.

11. The reception method according to claim 10, further comprising:

performing, by an electro-optical converter of the circuitry, electro-optical conversion on the one of the transmission video data based on the conversion characteristic information.

12. The reception method according to claim 11, further comprising:

outputting, as the video data for display, the encoded video data instead of output video data of the electro-optical converter, in the switch period from when the first type of the transmission video data is switched to the second type of the transmission video data to at least when switching of electro-optical conversion characteristics of the electro-optical converter is completed, the encoded video data including the switching picture.

13. A system, comprising:

a transmission apparatus, including first circuitry configured to generate a video stream that switches between transmission video data of a plurality of types, each of the plurality of types of the transmission video data having a different predetermined opto-electronic conversion characteristic, insert identification information into the video stream, the identification information indicating the type of one of the transmission video data included in the video stream, and insert display switch information that includes switching picture data of a switching picture into the video stream when a first portion of the video stream corresponding to the transmission video data of a first type of the plurality of types is switched to a second portion of the video stream corresponding to the transmission video data of a second type of the plurality of types, the switching picture being displayed during a switch period between display of the transmission video data of the first type and the transmission video data of the second type; and a transmitter configured to transmit a multiplexed stream that includes the video stream, a reception apparatus, including a receiver configured to receive the video stream and the identification information inserted into the video stream, and second circuitry configured to decode the video stream to obtain the one of the transmission video data, display the switching picture based on the display switch information, and process the one of the transmission video data based on the identification information to obtain video data for display, wherein the multiplexed stream includes one of an MPEG-2 transport stream, an MPEG media transport (MMT) stream, or an ISO base media file format (ISOBMFF), the identification information includes conversion characteristic information, the conversion characteristic information indicating an opto-electronic conversion characteristic of the one of the transmission video data or an electro-optical conversion characteristic corresponding to the opto-electronic conversion characteristic, the display switch information includes encoded video data for display at a reception device in the switch period for switching the display from the first type of the transmission video data to the second type of the transmission video data, the conversion characteristic information is inserted into at least one of an area of a sequence parameter set (SPS) network abstraction layer (NAL) unit and an area of a supplemental enhancement information (SEI) NAL unit, and the identification information is inserted into the multiplexed stream, the identification information indicating the type of the one of the transmission video data included in the video stream contained in the multiplexed stream, such that the type of the one of the transmission video data obtained after switching is indicated at a timing earlier than a timing of the switch to the type of the one of the transmission video data.

* * * * *

UNITED STATES PATENT AND TRADEMARK OFFICE
CERTIFICATE OF CORRECTION

PATENT NO. : 10,848,800 B2  
APPLICATION NO. : 15/777353  
DATED : November 24, 2020  
INVENTOR(S) : Ikuo Tsukagoshi Page 1 of 1

It is certified that error appears in the above-identified patent and that said Letters Patent is hereby corrected as shown below:

In the Claims

Column 22, Line 1, Claim 4 delete "transmitted" and insert --transmitter--, therefor.

Signed and Sealed this  
Fifth Day of January, 2021

Andrei Iancu  
*Director of the United States Patent and Trademark Office*